United States Patent [19]

Sarbacher et al.

[11] 4,031,296
[45] June 21, 1977

[54] ELECTROCHEMICAL ENERGY CELL

[75] Inventors: Robert I. Sarbacher, Marina Del Ray; John C. Bogue, Santa Monica, both of Calif.

[73] Assignee: John C. Bogue, Santa Monica, Calif.

[22] Filed: Aug. 11, 1975

[21] Appl. No.: 603,786

Related U.S. Application Data

[63] Continuation of Ser. No. 358,896, May 10, 1973, abandoned.

[52] U.S. Cl. .............................................. 429/116
[51] Int. Cl.² ........................................ H01M 6/36
[58] Field of Search ......................... 136/112–114, 136/90; 429/116

[56] References Cited

UNITED STATES PATENTS

| | | | |
|---|---|---|---|
| 2,847,494 | 8/1958 | Jeannin | 136/114 X |
| 2,852,592 | 9/1958 | Salauze | 136/90 |
| 2,862,038 | 11/1958 | Blaru | 136/90 |
| 3,470,029 | 9/1969 | Meyers et al. | 136/114 X |
| 3,669,753 | 6/1972 | Kaye | 136/114 |
| 3,674,566 | 7/1972 | Powers | 136/114 |
| 3,712,834 | 1/1973 | Doe et al. | 136/114 |
| 3,741,811 | 6/1973 | Coury | 136/114 X |
| 3,743,545 | 7/1973 | Merz et al. | 136/114 |
| 3,748,183 | 7/1973 | Zoleski | 136/114 |

Primary Examiner—C. F. Lefevour

Attorney, Agent, or Firm—Witherspoon, Lane & Hargest

[57] ABSTRACT

Electrochemical energy cells are disclosed. The energy cells are basically reserve-type batteries in which the electrolyte is separated from the electrodes until the battery is ready for use. In a first embodiment, the battery is a cylindrical battery in which the electrolyte is stored in a frangible envelope inside the battery case and above the electrode structure. Means are provided to break the envelope holding the electrolyte to permit the electrolyte to flow into the electrode cavity. The anode and cathode are designed to permit free flow of the electrolyte. In a second embodiment, the battery is also cylindrically shaped but is formed in a very thin or short cylinder. In this second embodiment the electrolyte is stored in a frangible envelope in the center of the battery casing. Again, means are provided to break the frangible envelope so that the electrolyte can flow into the electrode cavity and activate the battery. A plurality of anodes surround an anode cylinder and are electrically secured thereto and a plurality of cathodes surround the anode cylinder and are electrically connected to the battery case. In a third embodiment, the battery is fabricated as a rectangular, flat pack. The electrolyte is stored in a frangible envelope which is broken by means of a pair of hinged plates which are folded over the battery and squeezed to release the electrolyte.

10 Claims, 21 Drawing Figures

ELECTROCHEMICAL ENERGY CELL

This is a continuation, of application Ser. No. 358,896 filed May 10, 1973 now abandoned.

BACKGROUND OF THE INVENTION

This invention relates to electrochemical energy cells, and more particularly to reserve-type batteries having a high energy and current capacity.

Reserve-type batteries are known in the art. They are batteries in which the electrodes are fully assembled for cooperation, but the electrolyte is held in reserve in a separate container until it is desired the batteries be activated. Since there is no consumption of the electrodes under these circumstances, the shelf life of these batteries is essentially unlimited. The battery is activated by transferring the electrolyte from its container to the battery electrode compartment. Such batteries are disclosed in co-pending application Ser. No. 257,643 filed May 30, 1972 now abandoned and assigned to the assignee of this invention.

While this invention relates basically to reserve-type batteries, it is also directed to such batteries having a high energy and a high current capacity. To obtain a high energy and high current capacity, the batteries of this invention may utilize the particular electrode structure disclosed in co-pending application Ser. No. 879,429 filed Nov. 24, 1969 now U.S. Pat. No. 3,749,608 for "Primary Electrochemical Energy Cell" and assigned to the assignee of this invention. The said co-pending application for "Primary Electrochemical Energy Cell" discloses a specific anode and cathode structure which, when incorporated into a battery, provides a battery having a high energy and high current capacity. Since reserve batteries of this invention may utilize the anode and cathode structure of said co-pending application for "Primary Electrochemical Energy Cell", the teachings of that application are specifically incorporated by reference into this application.

SUMMARY OF THE INVENTION

This invention relates to reserve-type batteries in which the electrolyte is held separated from the electrode compartment until the battery is to be put to use. At that time, the electrolyte is released from its container and flows into the electrode compartment to activate the battery. The batteries of this invention all may utilize the anode-cathode structure disclosed in said co-pending application Ser. No. 879,429 for "Primary Electrochemical Energy Cell". As disclosed in said co-pending application Ser. No. 879,429, the electrode structure comprises a foraminous anode, a porous separator overlaying said foraminous anode and substantially conforming in surface contour to the perforations in the foraminous anode, and a cathode overlaying said porous separator and also substantially conforming in surface contour to the perforations in the anode. In addition to this basic cathode and anode structure, said co-pending application Ser. No. 879,429 discloses a second embodiment in which the anode and cathode are each formed from a strip of material, folded sinusoidally to form the electrode structure. The batteries of this invention can also use this type of electrode structure.

Three embodiments of the reserve battery of this invention are disclosed. In the first embodiment, the battery is formed as a cylindrical battery with the electrolyte stored in a frangible container above the electrode compartment inside the battery container. Means are provided to break the envelope to permit the electrolyte to flow into the electrode compartment. The second embodiment is also formed as a cylindrical battery, but in this second embodiment the battery is formed as a flat or thin cylinder. In this thin cylindrical configuration the electrolyte is held in a frangible container that is located in the center of the battery casing with the electrodes surrounding the envelope. Again means are provided to break the envelope to permit the electrolyte to flow into the electrode compartment and activate the battery. In the third embodiment, the battery is fabricated as a thin, flat, rectangular pack. The electrolyte is held in a frangible container which is broken by means of a pair of hinged plates or leaves that are folded over the battery and squeezed to rupture the electrolyte envelope and permit the electrolyte to flow into the electrodes.

BRIEF DESCRIPTION OF THE DRAWING

A complete understanding of the particulars of the invention can be obtained from the following detailed description when read in conjunction with the annexed drawings in which.

DESCRIPTION OF THE INVENTION

Figure 1:
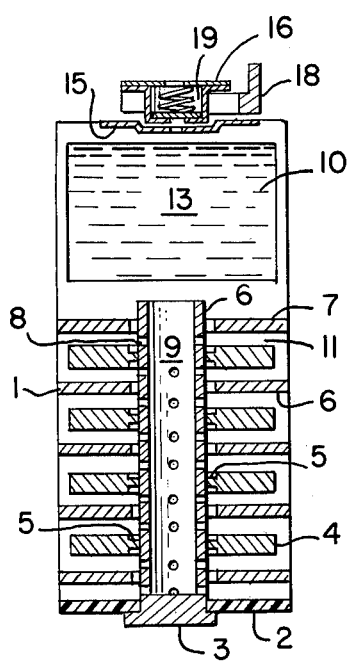
FIG. 1 shows a first cylindrical embodiment of the invention.

Referring to FIG. 1, this figure shows a first embodiment of this invention in which the battery is arranged in a cylindrical configuration. The battery is housed in a metallic container 1 at one end of which is an insulating plastic disc 2 which supports the anode terminal 3. The anode structure comprises an anode shaft 6, to which the anode discs 4 are welded at the junctions 5. The cathodes 7 are welded to the metallic cylindrical case 1 at the point 6. When assembling the battery, the cathodes 7 and anodes 4 are alternately placed in the battery container with a tool designed for this purpose which permits the anode and cathode electrodes to be lazer welded at the surfaces indicated. That is, the anode discs are welded to the anode shaft 6 and the cathodes 7 are welded to container 1. Thus, container or case 1 becomes the cathode of the battery and the center, cylindrical shaft 6 becomes the anode.

Until the battery is to be activated, the electrolyte 13 is stored in the container 10. Container 10 may be made of glass, plastic, or any other suitable, frangible material. When container 10 is broken, electrolyte 13 flows down into the electrode structure. In order to facilitate the flow of electrolyte 13 into the electrode structure, anode shaft 6 is hollow with a center hole 9 and is provided with a plurality of the perforations 8. Four sets of holes or perforations 8 are provided along the length of shaft 6.

Figure 2:
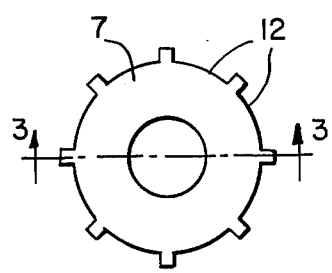
FIG. 2 shows a plan view of one of the cathode plates of the battery of FIG. 1.
Figure 3:
FIG. 3 shows a section of the cathode plate of FIG. 2.
Figure 4:
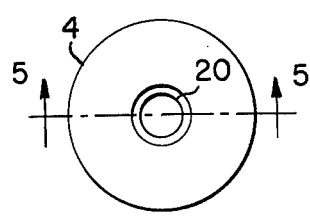
FIG. 4 shows a plan view of an anode disc of the battery of FIG. 1.
Figure 5:
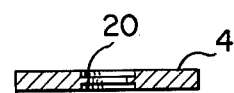
FIG. 5 shows a sectional view of the anode disc of FIG. 4.
Figure 6:
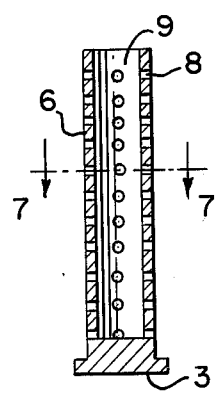
FIG. 6 shows a cross section of the support for the anode of the battery of FIG. 1.
Figure 7:
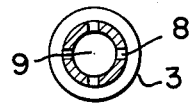
FIG. 7 shows an end view of the support of FIG. 6.

In addition to the center hole and perforations in anode shaft 6, the cathode discs 7 are also constructed to facilitate the dispersal of electrolyte 13. FIG. 2 shows a plan view of the construction of cathode discs 7. As shown in this figure, a cathode disc 7 contains the slots 12. When the cathode discs are placed in battery container 1, slots 12 provide an opening between container 1 and the cathode discs so that the electrolyte can flow down between the inside of the container and the cathode discs. FIG. 3 merely shows a cross section of the cathode disc of FIG. 2.

Figure 8:
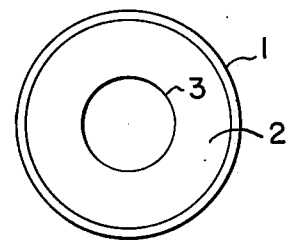
FIG. 8 shows an end view of the positive terminal end of the battery of FIG. 1.

FIG. 8 is an end view of the anode terminal end of the battery of FIG. 1. As shown in FIG. 1, this is the bottom of the battery. FIG. 8 clearly shows that anode terminal 3 is insulated from battery case or container 1 by means of an insulating disc 2. Further, this figure shows that the battery is clearly cylindrical in configuration.

Figure 9:
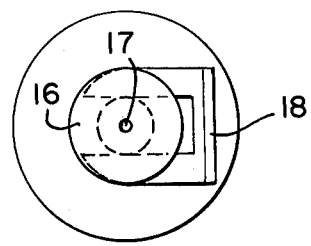
FIG. 9 shows an end view of the cathode end of the battery of FIG. 1.
Figure 10:
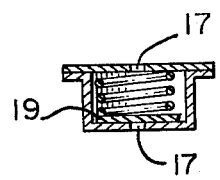
FIG. 10 shows a detailed view of the activating plunger and relief valve of the battery of FIG. 1.

Before the battery can be activated and provide useful energy, it is obvious that electrolyte 13 must be released from container 10. The apparatus for breaking frangible container 10 is shown in FIGS. 1, 9 and 10. A spring-biased plunger 16 is utilized to break frangible envelope 10. A stop 18 is provided to prevent accidental depression of plunger 16. Stop 18 is removed by pulling it out from under plunger 16, and plunger 16 is then depressed to break envelope 10. When this envelope breaks, electrolyte 13 will flow through notches 12 in the cathode discs 7 and down the central hole 9 of anode tube 6 and out through the holes 8 into the interelectrode space 11 thus energizing the battery. When the battery is being energized, gases are generated within the battery. The gas pressure developed could become sufficiently great to damage the battery. Therefore, a vent hole 17 is provided in plunger 16 to permit the gases to escape. When the pressure within battery container 1 rises to a point where the spring of plunger 16 is depressed, the gas will pass through plunger 16 by means of the holes 17 into the surrounding air by lifting the valve 19. Valve 19 normally closes the holes 17 by the action of the spring of spring-biased plunger 16. In summary then, the battery of FIG. 1 is activated by merely removing the stop 18 and depressing the plunger 16 which action breaks the envelope 10 and permits the electrolyte 13 to flow into the electrode compartment and activate the battery.

Figure 11:
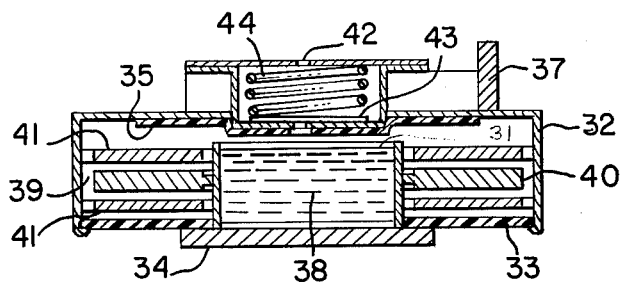
FIG. 11 shows a thin, cylindrical embodiment of the invention.

FIG. 11 shows a second embodiment of the invention in which the battery also has a cylindrical configuration. However, in this embodiment the cylinder is a thin cylinder. In fact, as compared to the diameter of the cylinder, the battery is very thin. The construction of the battery shown in FIG. 11 is very similar to the construction of the battery shown in FIG. 1 except that the electrolyte 38 is stored in a container 31 which is located in the center of the battery. The short, metallic container 32 has a plastic disc 33 secured at one end thereof. Plastic disc 33 insulates the anode terminal 34 from metallic container 32. The other end of metallic container 32 holds a flexible plastic disc 35. The anode disc 40 and the cathode disc 41 are basically identical to the anodes and cathodes of the battery of FIG. 1.

Figure 12:
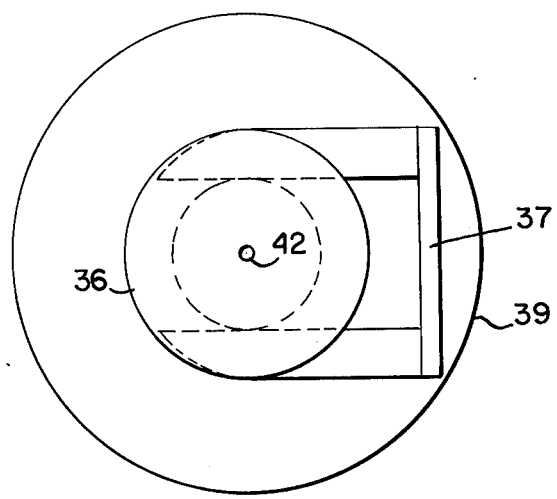
FIG. 12 shows an end view of the battery of FIG. 11 from the cathode side.
Figure 13:
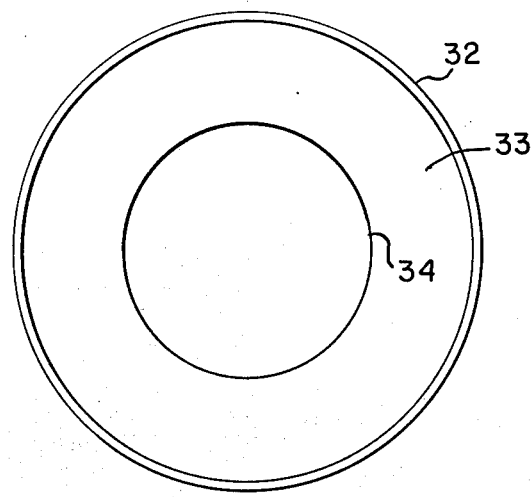
FIG. 13 shows an end view of the battery of FIG. 11 from the anode side.

FIG. 13 shows the anode terminal end of the battery of FIG. 11, and FIG. 12 shows the other end of the battery of FIG. 11. FIGS. 11 and 12 show the activating mechanism of the battery of FIG. 11. This activating mechanism is similar to the activating mechanism of the battery of FIG. 1. Again, a plunger 36 biased by means of a spring 44 is utilized. A stop 37 is provided to prevent accidental activation of the battery. To activate the battery, the stop 37 is pulled out from under plunger 36 and plunger 36 is depressed to break frangible envelope 31. As was the case in FIG. 1, envelope 31 can be made of glass, plastic or any other frangible material. When envelope 31 is broken, the electrolyte can flow into the interelectrode space 39 to activate the battery. Vent holes 42 are provided to permit the escaping of the gases generated within the battery. A valve 43 normally holds vent hole 42 closed. When the pressure is sufficiently great, valve 43 will open and permit the escape of the internal gases.

Figure 14:
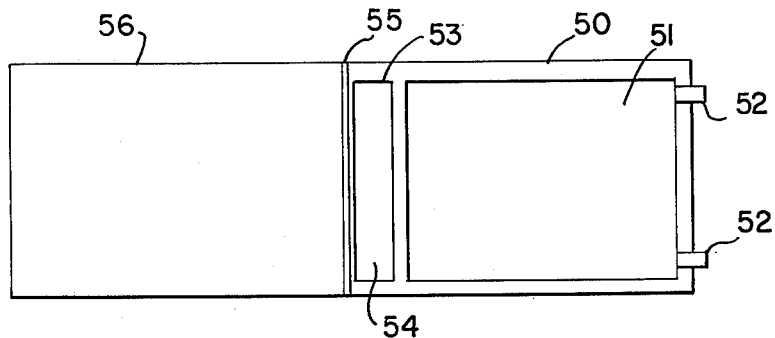
FIG. 14 shows a third embodiment of the invention in which the battery has a thin, rectangular configuration.
Figure 15:
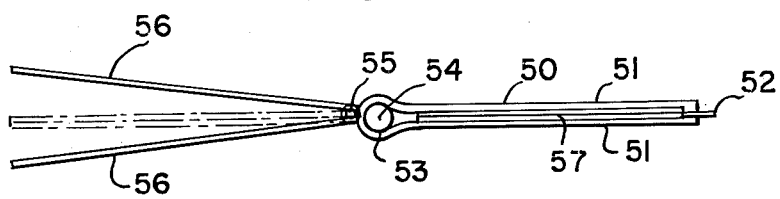
FIG. 15 shows a side view of the battery of FIG. 14.
Figure 16:
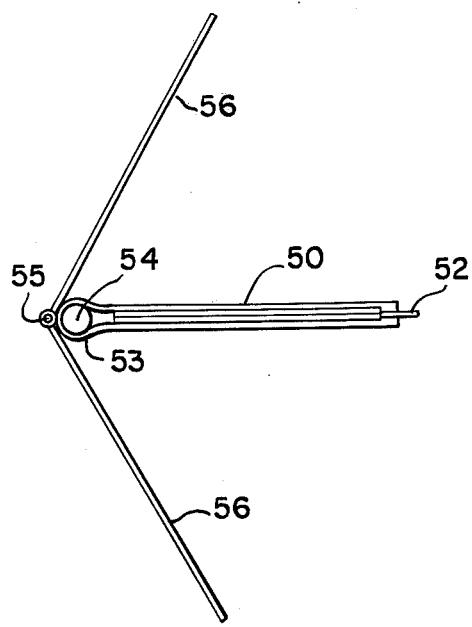
FIG. 16 shows another side view of the battery of FIG. 14.
Figure 17:
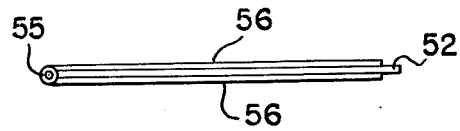
FIG. 17 shows a side view of the battery of FIG. 14 after the battery has been activated.

FIG. 14 shows a third embodiment of the invention in which the battery is constructed as a flat, rectangular pack. The battery has a flexible, plastic case 50 which contains the electrodes 51. The terminals 52 are brought out as indicated in FIGS. 14 through 17. A thin, frangible envelope made of glass or any other suitable material holds the electrolyte 54. The metallic plates 56 are connected to a hinge 55 in such a way that metal plates 56 can be separated and folded under on plastic plates 50 as indicated in FIGS. 15, 16 and 17.

When metal plates 56 are folded under and pressed against plastic container 50, they break frangible container 53 and force the electrolyte into the interelectrode space 57, thereby activating the battery. The plates 56 may then be detached from hinge 55 or left in the position shown in FIG. 17, if desired. However, if metal plates 56 are detached, the battery may be forced to fit into a number of desired configurations since the battery is relatively flexible.

The anodes and cathodes of the batteries of FIGS. 1, 11 and 14 may be made of any suitable anode and cathode material. These electrodes will, of course, have the shape necessary to be accommodated into the particular overall battery configuration. Thus, in the batteries of FIGS. 1 and 11, these electrodes are circular discs; and in the battery of FIG. 14, these electrodes are flat plates. While these electrodes may be any well known type of cathode and anode electrode, the anodes and cathodes disclosed in said co-pending application Ser. No. 879,429 are ideally suitable for use with the batteries of this invention. The electrodes disclosed in said co-pending application Ser. No. 879,429, when used with the batteries of this invention, provide a reserved battery or cell having a high energy and current capacity. Therefore, as mentioned above, the electrodes and the teachings of said co-pending application Ser. No. 879,429 are specifically incorporated into this application by reference.

Figure 18:
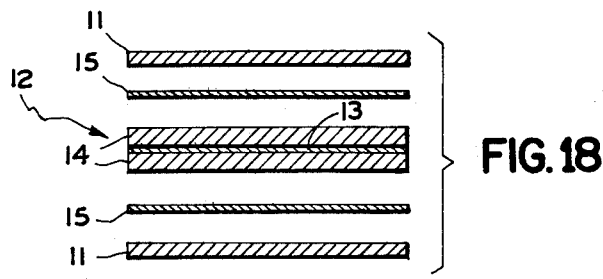
FIGS. 18–21 correspond to FIGS. 1–4 of said co-pending application Ser. No. 879,429.
Figure 19:
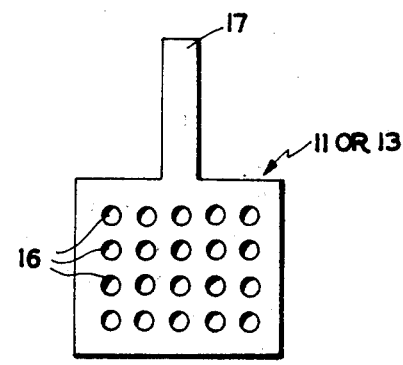
Figure 20:
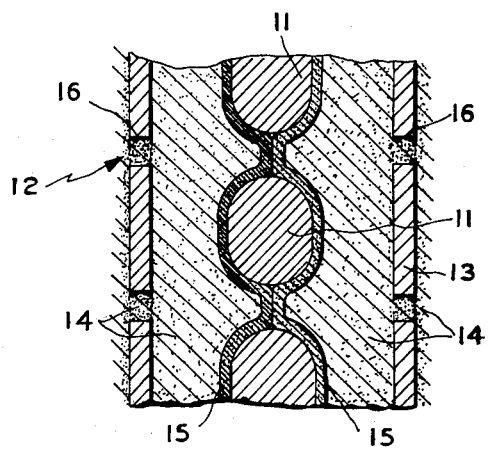

FIGS. 18–21 of the drawing correspond to FIGS. 1–4 of said co-pending application Ser. No. 879,429. These figures are included in this application for ease of description of this invention. Briefly, FIGS. 18–21 show the electrode structure for a primary electrochemical energy cell. FIGS. 18 and 20 the electrode structure of a partial battery of cells as comprising a pair of anodes 11, a pair of porous separators 15, and a cathode 12. Of course, more electrodes can be provided and the cathodes and anodes would be arranged alternately with a fibrous separator between each cathode and anode. As shown in FIG. 19, the anodes 11 are made of a flat element having holes 16 therein. Cathode 12 is also made of a foraminous base element 13 having the holes 16 as indicated in FIG. 2. The foraminous base element 13 used to make the cathode 12 is a stainless steel element coated with a thin coating of sintered nickelous ammonium sulfate. Base element 13 is coated with a coating of an electrochemically active material 14 to form the entire cathode structure 12. The active cathode material 14 is so applied to base element 13 that it completely covers the surfaces of base element 13 and completely fills in the voids or holes 16. As can be seen in FIG. 20, the anode and cathode plates, made as described above, are stacked together to form a battery. The plates are so stacked that the porous separator conforms to the holes in the anode, and the cathode surface also substantially conforms to the perforations in the anode.

Figure 21:
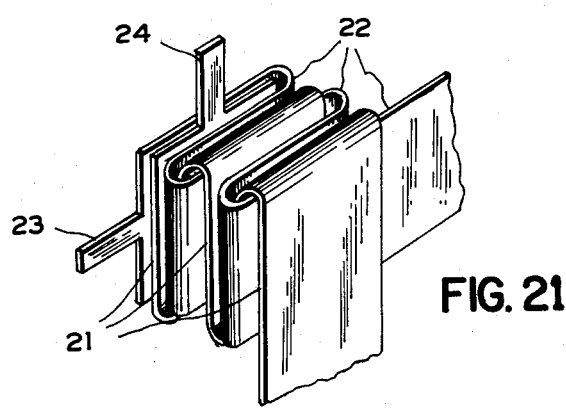

FIG. 21 shows a different arrangement of the anode and cathode electrodes or plates. In this figure a first electrode strip 21 is sinusoidally formed into a number of superposed leaves, while a second electrode strip 22 is interleaved therewith by being similarly sinusoidally formed orthogonally to the first strip 21. The tabs 23 and 24 provide the terminals for the two electrodes. One of the electrode strips is the anode and corresponds in structure to the anode strip 11 as described above. The other electrode is the cathode and corresponds in structure to the cathode 12 described above. A porous separator or separators, between the leaves, is not shown to avoid unnecessary confusion in the drawing; but such a separator or separators are used as described above.

The above description is but a brief description of the invention shown in FIGS. 18–21. This invention is, as stated above, the subject matter of said co-pending application Ser. No. 879,429, the teachings of which are incorporated herein. Therefore, a detailed understanding of the invention shown in FIGS. 18–21 can be obtained from a reading of said co-pending application Ser. No. 879,429. The above described electrode structure can be used for the anode and cathode electrodes of the batteries shown in FIGS. 1, 11 and 14. These anode and cathode electrodes can be used in the batteries with or without the porous separator. Of course conventional electrodes can also be used in the batteries of FIGS. 1, 11 and 14. However, the electrode structure shown in FIGS. 18–21 provides a battery having a high energy and high current capacity, as described in said co-pending application Ser. No. 879,429. Therefore, this electrode structure is highly desirable.

While the invention has been described with reference to particular embodiments, it will be apparent to those skilled in the art that various modifications and changes can be made to the embodiments described without departing from the spirit and scope of the invention as set forth in the appended claims.

What is claimed is:
1. A reserve battery that remains in an inactive state until activated comprising:
 a. a hollow cylindrical battery case being open at one end and having a circular opening at its other end, the axis of said circular opening being substantially coincident with the vertical axis of said cylindrical battery case;
 b. an insulating disc closing said open end of said battery case, said insulating disc having a circular opening in substantially the center thereof;
 c. a perforated hollow anode cylinder located inside said battery case, the vertical axis of said anode cylinder being substantially coincident with the vertical axis of said battery case and the axis of said circular opening of said insulating disc;
 d. a plurality of anode electrodes surrounding said anode cylinder and electrically secured thereto, said plurality of anode electrodes being spaced apart along the length of said anode cylinder;
 e. a plurality of cathode electrodes surrounding said anode cylinder, said cathode electrodes being electrically connected to said battery case, said plurality of cathode electrodes being spaced along the length of said anode cylinder in such a manner that said plurality of anode electrodes and said plurality of cathode electrodes are alternately spaced along the length of said anode cylinder;
 f. a substantially cylindrical shaped anode terminal secured to said insulating disc and to one end of said anode cylinder, the other end of said anode cylinder being unsecured, said anode terminal covering said opening in said insulating disc;
 g. a frangible envelope containing an electrolyte, said frangible envelope being located inside said battery case adjacent said other end of said battery case;
 h. a flexible disc having a gas vent in substantially the center thereof, said flexible disc being secured to said other end of said battery case to close said circular opening in said other end of said battery case;
 i. a gas valve located over said gas vent in said flexible disc, said gas valve being free to move under pressure from gas generated inside said battery case to permit gas to escape through said gas vent in said flexible disc; and
 j. a spring biased plunger secured to said flexible disc for depressing said flexible disc to thereby break said frangible envelope to permit said electrolyte to flow into the area of said battery case housing said anode and cathode electrodes to activate said battery and said plunger having a gas vent therein communicating with said gas vent in said flexible disc.

2. A reserve battery as defined in claim 1 wherein a U-shaped stop is removably located under said spring-biased plunger to prevent accidental depression of said plunger, said stop being removed to activate the battery.

3. A reserve battery as defined in claim 2 wherein said battery case forms the cathode terminal.

4. A reserve battery as defined in claim 3 wherein each one of said plurality of cathode electrodes is a circular disc having a plurality of tabs formed along its circumference for electrically connecting each one of said cathode discs to said battery case, said tabs being so formed that the edge of each of said cathode discs between said tabs is spaced apart from said battery case thereby forming slits through which said electrolyte can flow when said frangible envelope is broken, said circular cathode discs also having a circular opening in the center thereof to allow each of said cathode discs to be slipped over the outside of said anode cylinder, said circular opening in each of said cathode discs being larger in diameter than said anode cylinder so that said cathode discs are not in electrical contact with said anode cylinder.

5. A reserve battery as defined in claim 4 wherein each one of said plurality of anode electrodes is a circular disc having a circular opening in the center thereof, the circular opening of each of said anode discs having a diameter slightly larger than the outside diameter of said anode cylinder so that each one of said anode discs can be slipped over the outside of said anode cylinder.

6. A reserve battery as defined in claim 5 wherein said substantially cylindrical shaped anode terminal is a cylinder having one diameter along a portion of its length and a smaller diameter along the balance of its length, said smaller diameter protruding into said battery case through said opening in said insulating disc with the larger diameter being secured to the outside of said insulating disc and said anode cylinder being secured to the end of said anode terminal protruding into said battery case, said anode cylinder extending from said anode terminal toward said other end of said battery case but being substantially shorter than said battery case so that a space exists between said unsecured end of said anode cylinder and said other end of said battery case, said frangible envelope being located in said space between said unsecured end of said anode cylinder and said other end of said battery case.

7. A reserve battery as defined in claim 5 wherein said battery case is substantially larger in diameter than height, said substantially cylindrical shaped anode terminal is secured to the outside of said insulating disc and wherein said anode cylinder is secured to said anode terminal by extending said secured end of said anode cylinder through said opening in said insulating disc such that said secured end is in physical contact with said anode terminal, said anode cylinder extending toward said other end of said battery case inside said battery case.

8. A reserve battery as defined in claim 6 wherein each of said anode discs is foraminous, a porous separator overlays each of said anode discs and conforms to the perforations in its adjacent anode, and each of said cathode discs is placed against a porous separator opposite an anode disc, said cathode discs also conforming to the surface contour of said perforations of said anode discs, said anode and cathode discs and said separators being arranged along said anode cylinder beginning at the end of said anode cylinder adjacent said anode terminal with a cathode disc, followed by a porous separator, followed by an anode disc, followed by a porous separator, followed by a cathode disc and so on, ending with a cathode disc adjacent the end of said anode cylinder.

9. A reserve battery as defined in claim 7 wherein said frangible envelope is located inside said hollow anode cylinder.

10. A reserve battery as defined in claim 9 wherein each of said anode discs is foraminous, a porous separator overlays each of said anode discs and conforms to the perforations in its adjacent anode, and each of said cathode discs is placed against a porous separator opposite an anode disc, said cathode discs also conforming to the surface contour of said perforations of said anode discs, said anode and cathode discs and said separators being arranged along said anode cylinder beginning at the end of said anode cylinder adjacent said anode terminal with a cathode disc, followed by a porous separator, followed by an anode disc, followed by a porous separator, followed by a cathode disc and so on, ending with a cathode disc adjacent the end of said anode cylinder.

* * * * *